J. LUNZ.
ATTACHMENT FOR GRAIN SEPARATORS.
APPLICATION FILED APR. 1, 1915.
1,166,532.
Patented Jan. 4, 1916.
2 SHEETS—SHEET 2.
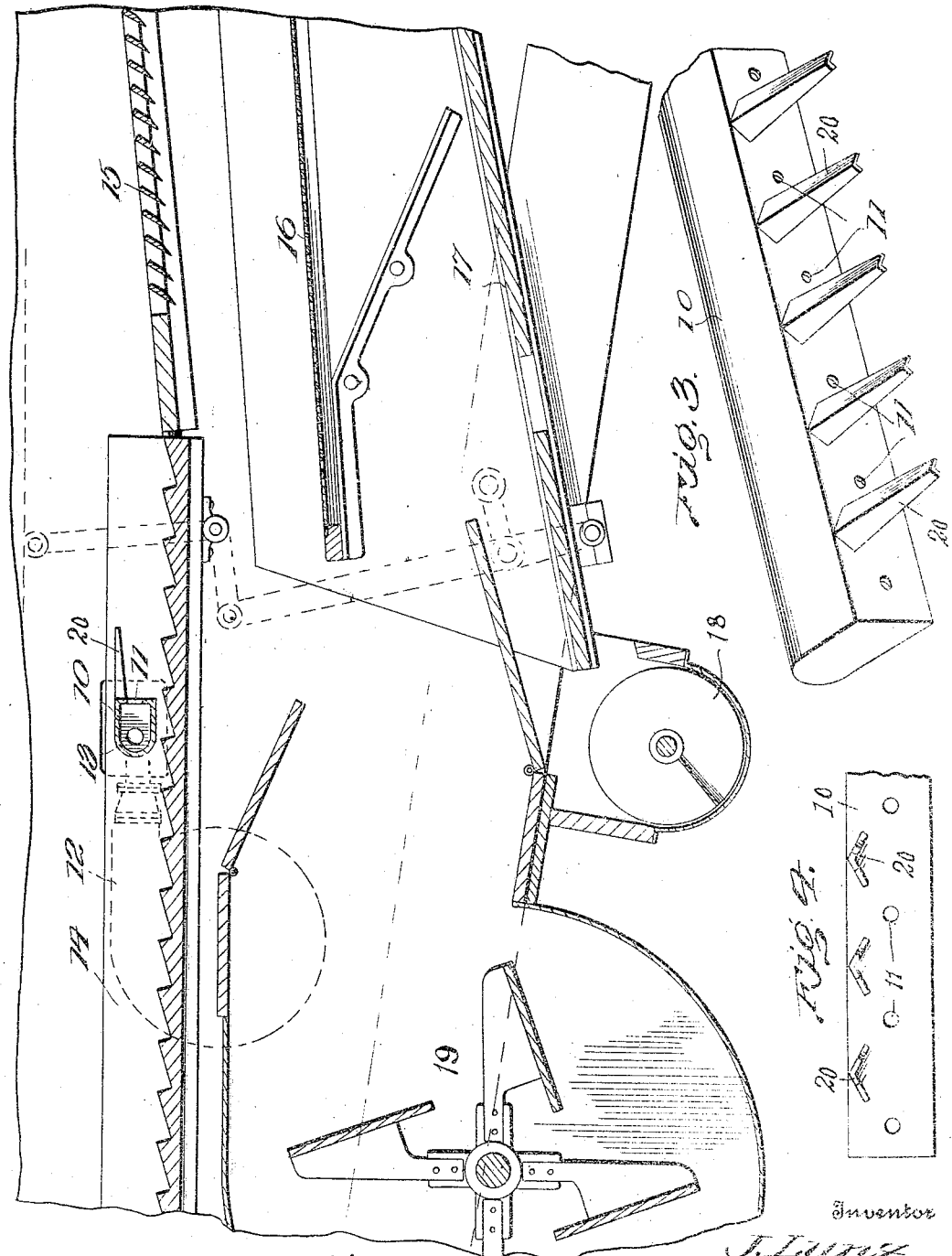

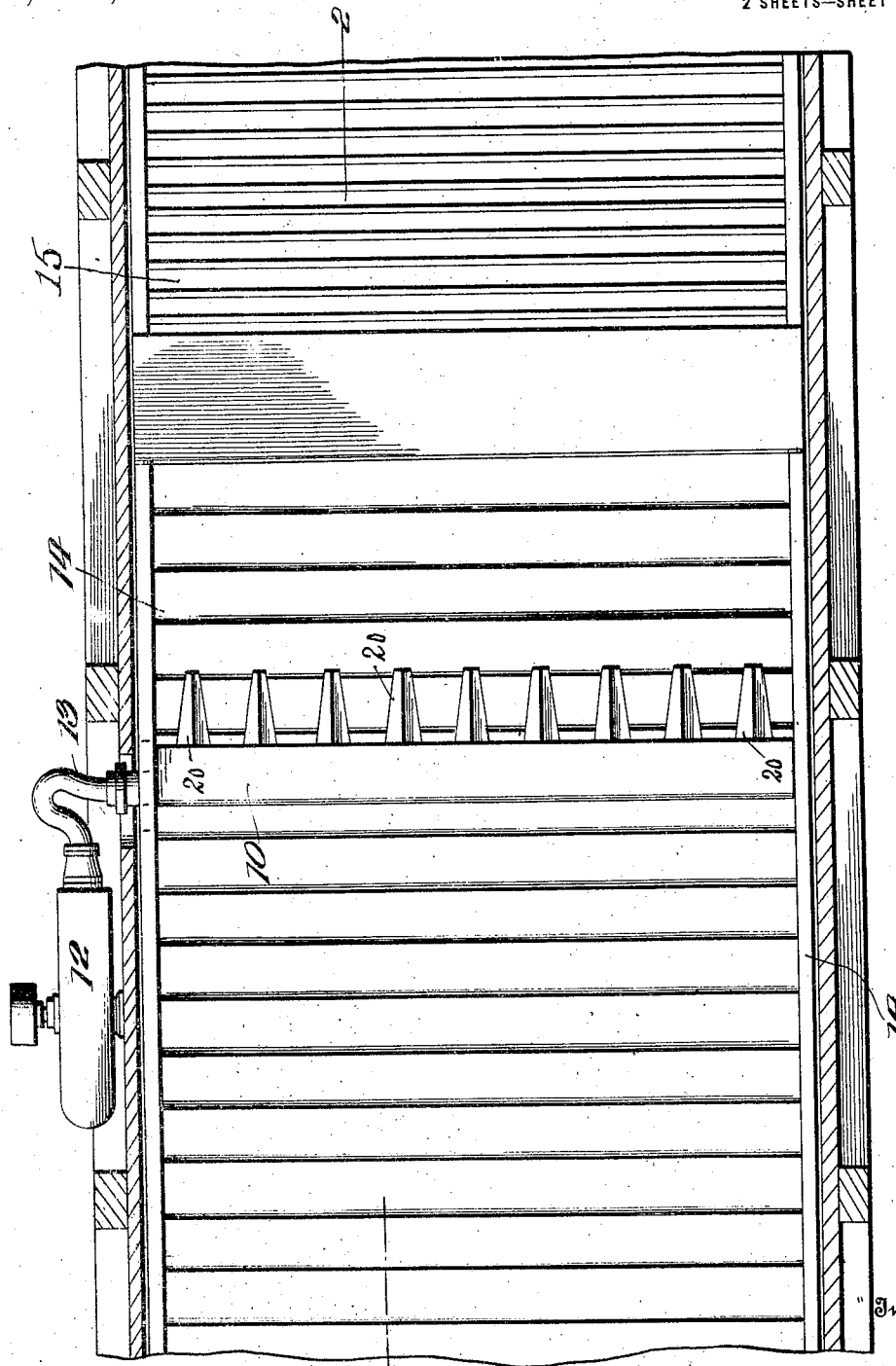

UNITED STATES PATENT OFFICE.

JOHN LUNZ, OF BELPRE, KANSAS.

ATTACHMENT FOR GRAIN-SEPARATORS.

1,166,532.  Specification of Letters Patent.  Patented Jan. 4, 1916.

Application filed April 1, 1915. Serial No. 18,559.

*To all whom it may concern:*

Be it known that I, JOHN LUNZ, a citizen of the United States, residing at Belpre, in the county of Edward and State of Kansas, have invented certain new and useful Improvements in Attachments for Grain-Separators, of which the following is a specification.

This invention relates to improvements in grain separators, and has for one of its objects to provide a simply constructed device whereby the action is materially improved and the separation of the chaff and other foreign matter from the grain more thoroughly accomplished.

Another object of the invention is to provide a simply constructed attachment for threshing machines and like devices, which supplements the ordinary action of the air currents and more thoroughly separates the chaff and other like matter from the grain and causes such separated matter to pass over the tail of the machine and prevents it from passing with the grain to the separating screens.

With these and other objects in view, the invention consists in certain novel features of construction as hereinafter shown and described and then specifically pointed out in the claims.

The improved device may be applied without material structural change to the grain separators of various forms, such as threshing machines, fanning mills and the like, but is more particularly designed for use in connection with threshing machines, and for the purpose of illustration is shown applied to the conventional grain pan or main shaker portion of a machine of this character, and in the drawings illustrative of the preferred embodiment of the invention, Figure 1 is a plan view of a portion of the grain pan of a threshing machine of conventional construction with the improvement applied, portions of the frame work or housing being shown in section. Fig. 2 is a section on the line 2—2 of Fig. 1. Fig. 3 is an enlarged detail perspective view of a portion of the attachment. Fig. 4 is a front elevation of the parts shown in Fig. 3.

Corresponding and like parts are referred to in the following description and indicated in all the views of the accompanying drawings by the same reference characters.

In operating the ordinary threshing machine equipped with a self-feeding apparatus, the cylinder is crowded to its full capacity necessitating an extra amount of work on the separating mechanism; hence a relatively large amount of the chaff and like products pass to the screens and necessitates the returning of the partly separated grain to the cylinders to be again subjected to the separating action. This returned matter frequently accumulates to an extent sufficient to choke the machine and requires the further feeding of the unthreshed grain to the cylinder to be stopped until the machine can "clear" itself, thus delaying the operation and causing the loss of valuable time. This tendency to "choke" could be obviated by increasing the force of the blast from the mill fan, but this would be objectionable, as much valuable grain would be carried out with the chaff.

To more thoroughly separate the chaff and like matter from the material after it passes from the cylinder without increasing the force of the blast of the mill fan, and thus obviate the necessity for returning a portion of the product to the cylinder, is the principal object of the present invention, which consists in an attachment for producing air currents at the proper point to supplement the action of the ordinary induced air currents of the separator and effect a more thorough separation of the chaff and like matter from the grain before it passes through the chaffer to the screens.

The improved device comprises a wind trunk 10, preferably of sheet metal, and oblong in outline, and preferably formed with one flat side and with a plurality of air orifices 11 in the flat side. The trunk 10 is preferably closed at one end and with a current producing member, such as a fan, represented conventionally at 12, connected at 13 to one end of the trunk. The trunk member 10 is connected to the grain pan of the separator, indicated as a whole at 14, the latter including the slatted member or "chaffer" 15. A portion of the shoe is also shown and includes an upper screen 16 and a gather board 17. The usual screw conveyer is represented at 18 and the mill fan at 19, these parts being of the usual construction. The trunk member 10 is preferably connected to the side members of the grain pan and thus extends across the latter a short distance above the slatted floor of the same and preferably a short distance from the discharge end. The member 10 being attached to the grain pan vibrates with the latter. The connecting member 13 is preferably formed of a section of flexible hose or like material to permit the device to thus move without cramping.

Projecting from the forward side of the trunk member 10 are guard fingers 20, each preferably formed with its upper face sloping toward its side edges and likewise reduced toward the free outer end. The orifices 11 are preferably located midway between the members 20 and spaced a considerable distance below the same, as shown in Fig. 4.

In the ordinary threshing machine, the product after passing through the cylinder passes over the grain pan and thence upon the chaffer 15 where the greater quantity of the chaff and like material is separated and carried over the tail by the blast of air from the fan while the grain kernels pass to the screens where they are subjected to the air blast and thence over the screen to the conveyer apparatus.

By locating the trunk 10 with its coacting orifices 11 and fingers 20 in the path of the unseparated grain and chaff before it reaches the chaffer 15, the grain and chaff are caused to pitch over the rapidly vibrating fingers 20 and are thus retained in the induced air currents forced through the orifices 11 and effectually and quickly separated so that as they pass in this separated condition to the chaffer 15 and into the path of the relatively strong air currents from the mill fan they are therefore in the best condition for the chaff to be blown over the tail and prevented from passing to the shoe. The air from the openings or orifices 11 spreads and becomes a solid mass and strikes the grain and chaff which are still on the slats of the grain pan and quickly separates what chaff may be still commingled therewith.

The air receiving member 10 is mounted upon the grain pan 14 so as to vibrate therewith and since the fingers 20 are carried by the member 10 it follows that they partake of the movement of the member and grain pan. The fan 12 is mounted upon the frame of the separator, hence is stationary. When it is remembered that the fan 12 is stationary and the air receiving member 10 movable the advantage of the flexible connection or tube 13 is manifest. The air outlets 11 face rearward, hence assist in advancing the grain besides carrying off the chaff. The initial separation of the grain from the chaff takes place about in line with the air receiving member 10, the grain being acted upon by gravitative action and dropping upon the pan in the rear of the member 10. During the dropping of the grain it is acted upon by the blast of air delivered from the member 10 and any chaff tending to drop with the grain is carried off by the blast of air from the member 10.

The improved device is simple in construction, can be applied without material structural change to threshing and like machines of various forms and makes and located at any required point relative to the separating mechanism of the machine. The member 13 will preferably be connected to the trunk at one end, as shown, but may be connected to the trunk at other points or at a plurality of points, but this would not constitute a departure from the principle of the invention and it is not deemed necessary to illustrate the same.

Having thus described the invention, what is claimed as new is:

1. The combination with a grain separator, of a wind trunk having a plurality of air orifices in one side, and a plurality of guard fingers coacting with the orifices.

2. The combination with a grain separator, of a wind trunk having a plurality of air orifices in one side, and a plurality of guard fingers extending from the trunk and located above the spaces between the orifices.

3. The combination with the grain pan of a grain separator, of a wind trunk carried by the grain pan and partaking of its motion and provided with a plurality of air escape orifices, a plurality of fingers extending from the trunk substantially in parallel relation to the longitudinal plane of the grain pan, and means for causing induced air currents to pass through said trunk.

4. In an apparatus of the class described including a separating mechanism, a main air current producing means, means for agitating the product of the separating mechanism located between the separating mechanism and the main air current producing means, and means for supplying preliminary air currents to the products of the separating mechanism while being agitated.

5. In an apparatus of the class described including a separating mechanism, a main air current producing means, and means for agitating the product of the separating mechanism located betwen the separating mechanism and the main air current producing means, and a wind trunk having a plurality of orifices and associated with said agitating means and partaking of its motion, whereby preliminary air currents are supplied to the products of the separating mechanism.

6. In an apparatus of the class described including a separating mechanism, a main air current producing means, and means for agitating the product of the separating mechanism, and a wind trunk having a plurality of orifices and fingers and associated with said agitating means and partaking of its motion whereby preliminary air currents are supplied to the separating mechanism and the products agitated by the fingers in the presence of the preliminary air currents.

7. In a grain separator and in combination with the usual grain pan, means for separating the grain from the straw and chaff, the same consisting of an air receiving member disposed in the length of the grain pan and in the path of the grain and having an air outlet facing rearward, and means for supplying air to such member under pressure.

8. In a grain separator and in combination with the usual grain pan, means for separating the grain from the straw and chaff, the same consisting of an air receiving member disposed in the length of the grain pan and in the path of the grain and having an air outlet facing rearward, means for supplying air to such member under pressure, and a plurality of spaced elements projecting rearward from the member.

9. In a grain separator and in combination with the usual grain pan, an air receiving member mounted upon the grain pan and in the path of the grain and having a plurality of outlets in its rear side, and a plurality of spaced elements carried by said member and projecting rearward therefrom and disposed a distance above the plane of the grain pan.

10. In a grain separator and in combination with the usual grain pan mounted to receive a vibratory movement, an air receiving member mounted upon the grain pan and movable therewith, a relatively fixed air blast supplying means, and a flexible connection between the air blast supplying means and the air receiving member.

In testimony whereof I affix my signature in presence of two witnesses.

JOHN LUNZ. [L. S.]

Witnesses:
 LEONARD R. MILLER,
 C. E. BARROW.